(No Model.)

C. M. HALL.
PROCESS OF REDUCING ALUMINIUM FROM ITS FLUORIDE SALTS BY ELECTROLYSIS.

No. 400,664. Patented Apr. 2, 1889.

Witnesses:

M. A. Bellinger
J. B. Bradford

Inventor
Charles M. Hall
by his atty
Mason, Fenwick & Lawrence

UNITED STATES PATENT OFFICE.

CHARLES M. HALL, OF OBERLIN, OHIO.

PROCESS OF REDUCING ALUMINIUM FROM ITS FLUORIDE SALTS BY ELECTROLYSIS.

SPECIFICATION forming part of Letters Patent No. 400,664, dated April 2, 1889.

Original application filed July 9, 1886, Serial No. 207,601. Divided and this application filed February 2, 1887. Serial No. 226,206.
(No model.)

*To all whom it may concern:*

Be it known that I, CHARLES M. HALL, a citizen of the United States, residing at Oberlin, in the county of Lorain and State of Ohio, have invented certain new and useful Improvements in the Process of Reducing Aluminium from its Fluoride Salts by Electrolysis; and I do hereby declare the following to be a full, clear, and exact description of the invention, such as will enable others skilled in the art to which it appertains to make and use the same.

In an application, Serial No. 207,601, filed by me July 9, 1886, I have described and claimed a process for reducing aluminium, consisting in dissolving alumina or the oxide of aluminium in a fused bath composed of the fluorides of aluminium and a metal more electro-positive than aluminium, and then passing an electric current through the fused mass, and in said application the combination of the fluorides of aluminium and sodium for the formation of the bath was claimed as a species or instance under the generic combination.

The invention described herein consists in the formation of a bath or solvent for the alumina by combining in suitable proportions the fluorides of aluminium and potassium, substantially as hereinafter more fully described and claimed.

Figure 1:
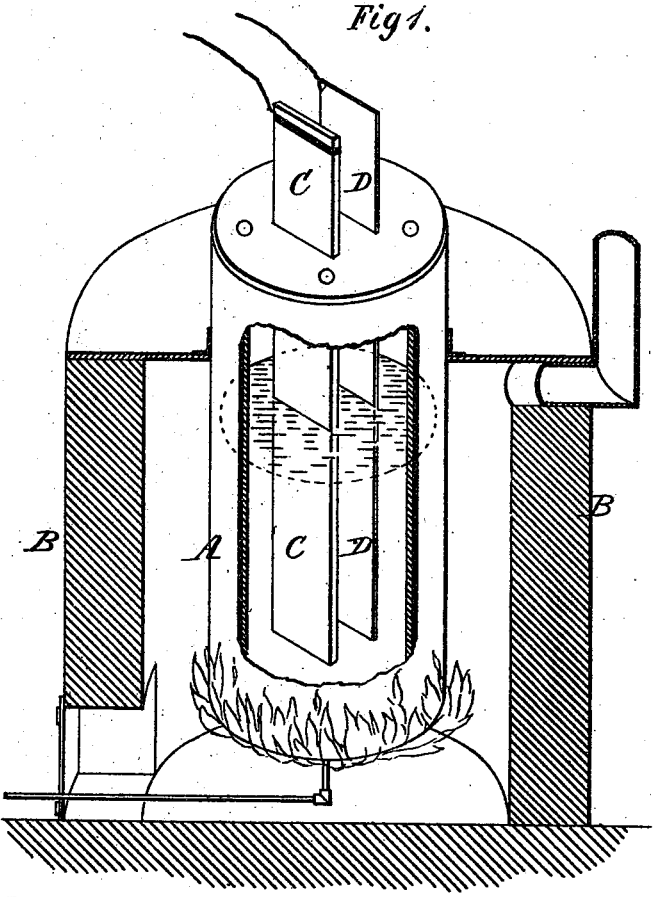
Figure 2:
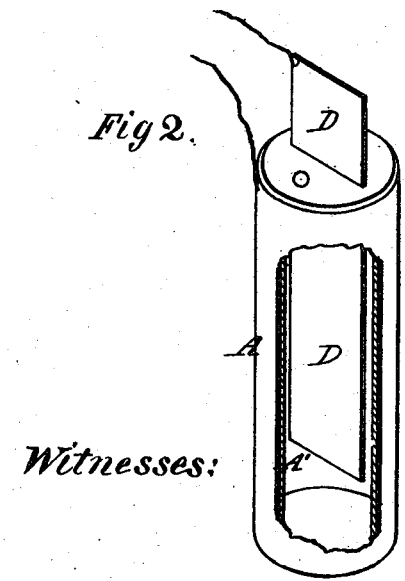
Figure 3:
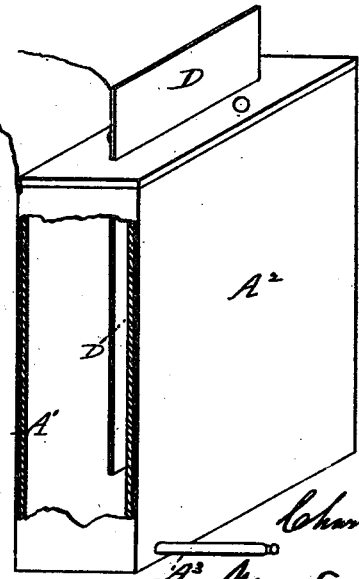

In the accompanying drawings, forming a part of this specification, Figure 1 is a sectional elevation of a form of apparatus applicable in carrying out my invention; and Figs. 2 and 3 are views, partly in section, of modified forms of crucible.

In the practice of my invention I form a fused bath or solvent for the alumina by melting in a crucible, A, a combination of the salts known as the "fluoride of aluminium" and the "fluoride of potassium." This combination, which may also be termed the "double fluoride of aluminium and potassium," is preferably formed by mixing together one hundred and sixty-nine parts of aluminium fluoride and one hundred and sixteen parts of potassium fluoride, such proportions of the ingredients corresponding to the formula $K_2Al_2F_8$. A variation in these proportions within certain limits produces only immaterial changes in operativeness of my process—as, for example, (as I now believe the fact to be,) a larger proportion of potassium fluoride increases the capacity of the bath for dissolving alumina at the same time lessens its fusibility, whereas a larger proportion of aluminium fluoride renders the bath more fusible, but decreases its capacity for dissolving alumina.

The combination of the fluorides of aluminium and potassium may be rendered more fusible and its capacity for dissolving alumina may be increased by the addition of lithium fluoride, or a partial substitution thereof, for potassium fluoride—as, for example, the combinations of the fluorides of aluminium, potassium, and lithium, represented by the formulas $KLiAl_2F_8$ or $K_3Li_3Al_4F_{18}$, are effective as regards their capability for dissolving alumina, and are quite fusible. These compounds or combinations of the fluorides of aluminium, potassium, and lithium can be conveniently made by saturating and neutralizing with hydrofluoric acid suitable proportions of hydrate of alumina and carbonate of potassium or lithium.

The crucible A, containing the above-described bath or solvent, is placed in a suitable furnace, B, and heated sufficiently to melt the bath—*i. e.*, to approximately a low red heat. The electrodes C and D, having suitable connections with a dynamo-electric machine or other suitable source of electric energy, are then inserted into the bath and a sufficient amount of alumina placed therein. The alumina is dissolved by the bath, and by the action of the electric current aluminium is reduced at the negative electrode D, and, being melted, sinks down to the bottom of the crucible. In making pure aluminium the negative electrode D should be formed of carbon or metal coated with carbon, so as to protect the metal from the aluminium, which has a great affinity for other metals. The oxygen goes to the positive electrode C, which may be formed of copper, platinum, or other suitable non-carbonaceous material. When the positive electrode is formed of copper, it soon becomes coated with an oxide of copper, which, while not materially affecting its conducting qualities under these conditions, forms a protecting covering over the surface of the copper as against the action of the oxygen, such oxygen thereafter escaping in a free state at the positive electrode. The aluminium may be removed from the crucible as it accumulates by any suitable means, or the contents of the crucible may be poured out and cooled, and the aluminium then separated from the solvent.

On account of the affinity which aluminium has for other metals, and also the corrosive action of fluorides on earthy materials, I prefer to form the crucible of metal—as iron, steel, copper, &c.—and protect the same from the action of aluminium by a carbon lining, A', as shown. The carbon lining A' may be employed as the negative electrode, as shown in Figs. 2 and 3, and as it is desirable that the negative electrode should have a large exposed surface, I prefer an arrangement of apparatus wherein the carbon lining is so employed.

Although a higher temperature may be employed, a low red heat is sufficient for carrying on the process, and on account of the liability of reducing the solvent I prefer to employ an electric current of low electro-motive force—as, for example, three or four volts, more or less.

As shown in Fig. 3, the crucible may be provided at its lower end with a discharge-tube, $A^3$, through which the aluminium may be drawn off from the crucible from time to time, as desired, without interrupting the reducing operation.

I claim herein as my invention—

1. As an improvement in the art of manufacturing aluminium, the herein-described process, which consists in dissolving alumina in a fused bath composed of the fluorides of aluminium and potassium, and then passing an electric current, by means of an anode formed of non-carbonaceous material, through the fused mass, substantially as set forth.

2. As an improvement in the art of manufacturing aluminium, the herein-described process, which consists in dissolving alumina in a fused bath composed of the fluorides of aluminium, potassium, and lithium, and then passing an electric current through the fused mass, substantially as set forth.

In testimony whereof I affix my signature in presence of two witnesses.

CHARLES M. HALL.

Witnesses:
M. A. BALLINGER,
J. S. BRADFORD.